May 29, 1928.
A. M. SEEGER
1,671,747
CROSS ARM MOUNTING
Original Filed June 19, 1925
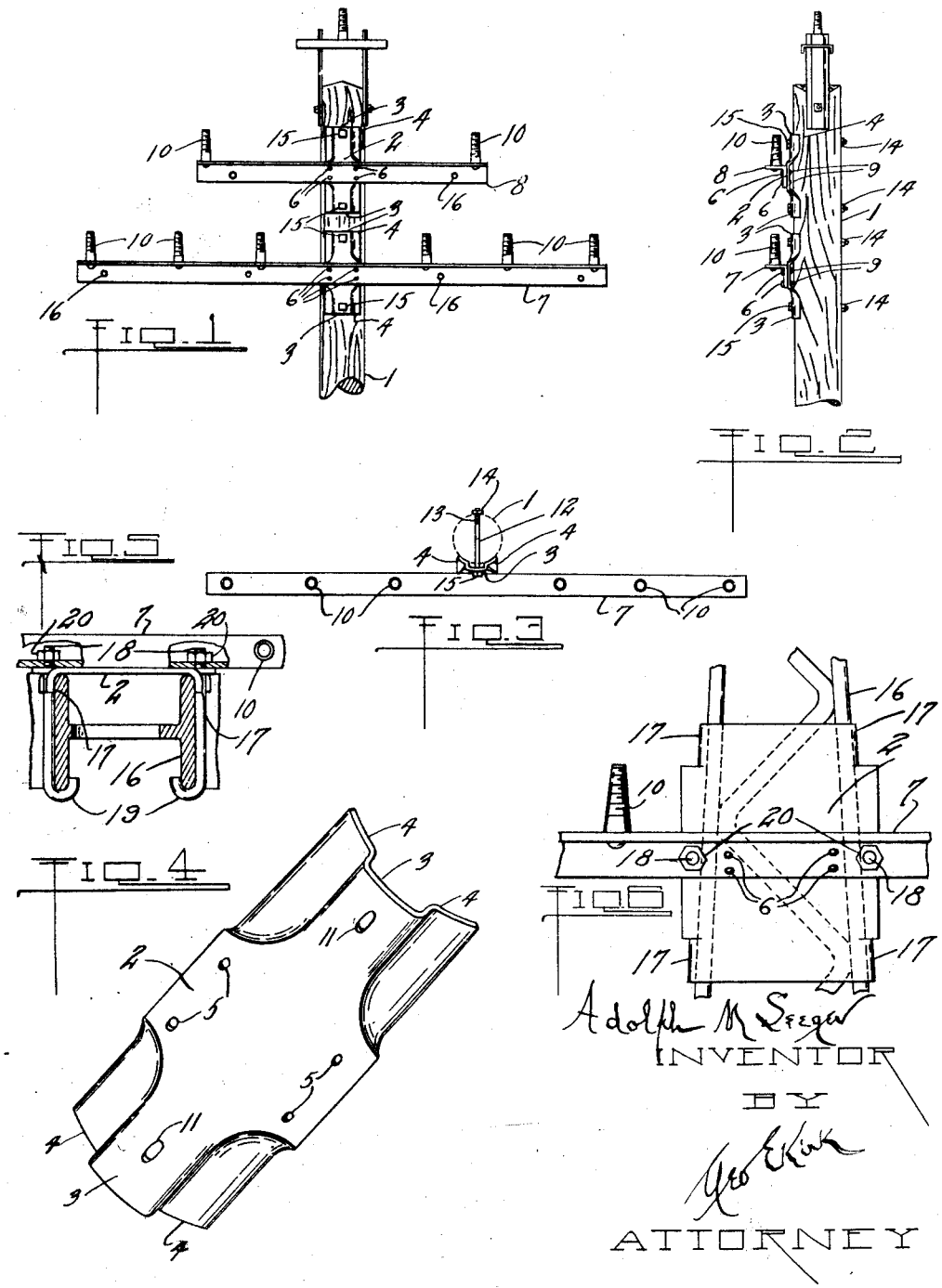

Patented May 29, 1928.

1,671,747

UNITED STATES PATENT OFFICE.

ADOLPH M. SEEGER, OF TOLEDO, OHIO.

CROSS-ARM MOUNTING.

Application filed June 19, 1925, Serial No. 38,189. Renewed January 17, 1928.

This invention relates to brackets or plates.

This invention has utility when incorporated in cross-arm connecting or mounting bracket means, as in assembling cross-arms with line poles of a cylindrical type.

Referring to the drawings:

Fig. 1 is a fragmentary side elevation of a line pole showing an embodiment of the invention incorporated therewith;

Fig. 2 is an end view of the cross arms as mounted in the structure of Fig. 1;

Fig. 3 is a plan view of a unit of the structure of Fig. 1;

Fig. 4 is a perspective view of a bracket;

Fig. 5 is a plan view, with parts broken away, of a plate adapted to a steel pole; and Fig. 6 is a fragmentary front elevation of the plate or bracket of Fig. 5.

Line pole 1 is shown as a pole of general cylindrical form. In accordance with the device of this invention, cross-arms may be anchored with such a type of pole rigidly against rocking and independently of gaining or notching the pole to provide a seat. To this end, oblong plate is provided having flat or straight seat 2 transversely of this plate intermediate the narrow width ends thereof. Laterally of this seat 2, this bracket or plate of sheet metal is provided with extensions 3 providing on the opposite side of this plate from the seat 2, concave seat portions 4 for snugly resting against the natural contour or external dimension of the line pole 1. In the normal use of the device of this disclosure, the bracket or plate at this seat region 2 is provided with openings 5 therethrough, which may be engaged by rivets 6 in mounting cross-arms 7, 8, or other type of cross-arm, rigidly with the plate or bracket. These rivets 6, protruding through the plate or bracket, have heads 9 on the side of this bracket or plate opposite to the seat region 2. Such assembly unit of cross-arm and plate may be brought to the job with the desired number of pins 10 for insulators thereon. This unitary structure as brought to the job for use, as assembled with the line pole 1, has through each opening 11 through the extensions 3, bolts 12 to protrude through the line pole 1 with threaded portions 13 to such bolts engaged by nuts 14 on the opposite side of the line pole 1. Accordingly, there is attachably assembled the cross-arm and bracket unit with the pole by these bolts 12 having heads 15. These bolts 12 are so spaced apart as to not materially weaken the line pole 1. Their purpose is for load support of the cross-arm unit vertically, while the lateral strains of the cross-arms for tilting is resisted by the seats 4 at the four-corners of the plate at the two extensions.

Accordingly, there is in this simple structure, a rigid and substantial mounting. The cross-arms 7, 8, may have additional openings 16 for depending insulator carrying brackets, brace supports or other means as may be desired.

In the showing in Figs. 5, 6, the major seat portion 2 carries the cross-arm 7 mounted thereon with its rivets 6 as fastening means. In this type of pole 16, seat portions 17 may be bent or hammered inward by the erector to the degree desired for driving down on the tapered pole. 16. Mounting bolts 18 having hook ends 19 may then be assembled through the cross-arm 7 and the plate for clamping the plate snugly in position with the pole 16 by drawing up the nut 20. Accordingly, the die for this blanking of the plate may be one adapted for producing this plate for structural pole with the ears 17 as the seats at the four corners.

What is claimed and it is desired to secure by United States Letters Patent is:—

A bracket as a unitary plate of approximately uniform thickness throughout its extent, said plate embodying a straight cross seat portion on one side for cross-arm connection therewith, the plate having upper and lower extensions from said arm seat inwardly offset to form four seats, which seats, as toward each other in vertical and horizontal pairs, are stiffened by said offset portions of the plate to the respective seats, said four seats being adapted for line pole engagement with a pole from the upper and lower edges of the plate, and said cross arm seat adapted for cross arm engagement approximately the distance between the vertical outer edges of the plate portions as engaging the pole.

In witness whereof I affix my signature.

ADOLPH M. SEEGER.